United States Patent
Cao et al.

(10) Patent No.: US 12,551,121 B2
(45) Date of Patent: Feb. 17, 2026

(54) BLOOD PRESSURE PREDICTION METHOD AND DEVICE FUSING NOMINAL PHOTOPLETHYSMOGRAPHY (PPG) SIGNAL DATA

(71) Applicant: Lepu Medical Technology (Beijing) Co., Ltd, Beijing (CN)

(72) Inventors: Jun Cao, Beijing (CN); Biying Zhang, Beijing (CN); Sihan Wang, Beijing (CN); Zejian Wu, Beijing (CN)

(73) Assignee: Lepu Medical Technology (Beijing) Co., Ltd, Beijing (CN)

( * ) Notice: Subject to any disclaimer, the term of this patent is extended or adjusted under 35 U.S.C. 154(b) by 268 days.

(21) Appl. No.: 18/248,755

(22) PCT Filed: Apr. 19, 2021

(86) PCT No.: PCT/CN2021/088023
§ 371 (c)(1),
(2) Date: Apr. 12, 2023

(87) PCT Pub. No.: WO2022/077889
PCT Pub. Date: Apr. 21, 2022

(65) Prior Publication Data
US 2023/0371831 A1 Nov. 23, 2023

(30) Foreign Application Priority Data
Oct. 12, 2020 (CN) .......................... 202011085575.X

(51) Int. Cl.
*A61B 5/024* (2006.01)
*A61B 5/00* (2006.01)
(Continued)

(52) U.S. Cl.
CPC ........ *A61B 5/02416* (2013.01); *A61B 5/7264* (2013.01); *G06N 3/0464* (2023.01); *G16H 50/30* (2018.01)

(58) Field of Classification Search
CPC .............. A61B 5/02416; A61B 5/7264; A61B 5/02108; A61B 5/7267; A61B 5/02141;
(Continued)

(56) References Cited

U.S. PATENT DOCUMENTS

2020/0015755 A1* 1/2020 Zhao ..................... A61B 5/7203
2020/0093386 A1 3/2020 Biswas et al.
(Continued)

FOREIGN PATENT DOCUMENTS

CN 104665768 A 6/2015
CN 109452935 A 3/2019
(Continued)

OTHER PUBLICATIONS

Esmaelpoor, Jamal, Mohammad Hassan Moradi, and Abdolrahim Kadkhodamohammadi. "A multistage deep neural network model for blood pressure estimation using photoplethysmogram signals." Computers in Biology and Medicine 120 (2020): 103719. (Year: 2020).*
(Continued)

*Primary Examiner* — Andrew M Moyer
(74) *Attorney, Agent, or Firm* — TraskBritt

(57) ABSTRACT

A method for predicting blood pressure by fusing calibrated photoplethysmography (PPG) signal data includes obtaining real-time PPG signal data, calibrated PPG signal data, calibrated diastolic blood pressure data, and systolic blood pressure data; using a CNN+ANN model to calculate the relative blood pressure data, and generating an ANN output tensor, according to the calibrated diastolic blood pressure and systolic blood pressure data, and the ANN output tensor,
(Continued)

performing blood pressure data calculation and generating a blood pressure tensor; if the predicted type information is a first type, performing a mean value calculation according to the blood pressure tensor, and generating diastolic blood pressure prediction data and systolic blood pressure prediction data; if the predicted type information is a second type, performing data extraction processing on the blood pressure tensor, and generating a diastolic blood pressure prediction data sequence and a systolic blood pressure prediction data sequence.

8 Claims, 3 Drawing Sheets

(51) Int. Cl.
  G06N 3/0464 (2023.01)
  G16H 50/30 (2018.01)
(58) Field of Classification Search
  CPC ....... A61B 5/02; A61B 5/021; A61B 5/02116; A61B 5/02125; A61B 5/024; G06N 3/0464; G06N 3/045; G06N 3/048; G06N 3/09; G16H 50/30
  See application file for complete search history.

(56) References Cited

U.S. PATENT DOCUMENTS

| | | | | |
|---|---|---|---|---|
| 2021/0375473 | A1* | 12/2021 | Gatys | G16H 50/20 |
| 2022/0211327 | A1* | 7/2022 | Zu | A61B 5/369 |

FOREIGN PATENT DOCUMENTS

| | | |
|---|---|---|
| CN | 111063420 A | 4/2020 |
| CN | 111248883 A | 6/2020 |
| CN | 111291727 A | 6/2020 |
| CN | 111358451 A | 7/2020 |
| CN | 111358453 A | 7/2020 |
| CN | 112336325 A | 2/2021 |
| EP | 2544125 A1 | 1/2013 |

OTHER PUBLICATIONS

Schlesinger, Oded, et al. "Estimation and Tracking of Blood Pressure Using Routinely Acquired Photoplethysmographic Signals and Deep Neural Networks." Critical Care Explorations 2.4 (2020): e0095. (Year: 2020).*
Fan et al., Continuous Non-Invasive Blood Pressure Prediction Method Based on Improved SVR Learning, Journal of System Simulation, vol. 32, No. 9, Sep. 30, 2020, pp. 1686-1692.
International Search Report for Application No. PCT/CN2021/0888023 dated Jul. 16, 2021, 3 pages.
International Written Opinion for Application No. PCT/CN2021/0888023 dated Jul. 16, 2021, 4 pages.
Shimazaki et al., Cuffless Blood Pressure Estimation from only the Waveform of Photoplethysmography using CNN, 2019 41st Annual International Conference of the IEEE Engineering in Medicine and Biology Society (EMBC), Dec. 31, 2019, pp. 5042-5045.

* cited by examiner

BLOOD PRESSURE PREDICTION METHOD AND DEVICE FUSING NOMINAL PHOTOPLETHYSMOGRAPHY (PPG) SIGNAL DATA

CROSS-REFERENCE TO RELATED APPLICATIONS

This application is a national phase entry under 35 U.S.C. § 371 of International Patent Application PCT/CN2021/088023 filed Apr. 19, 2021, designating the United States of America and published as International Patent Publication WO 2022/077889 A1 on Apr. 21, 2022, which claims the benefit under Article 8 of the Patent Cooperation Treaty to Chinese Patent Application Serial No. 202011085575.X, filed Oct. 12, 2020.

TECHNICAL FIELD

The disclosure relates to the technical field of signal processing, in particular, to a blood pressure prediction method and device fusing nominal photoplethysmography (PPG) signal data.

BACKGROUND

Photoplethysmography (PPG) is a non-invasive method to detect the change of blood volume in viable tissue by photoelectric means. Cardiac impulses make the blood flow per unit area in the blood vessel change periodically, causing blood volume to change accordingly so that a PPG signal indicating the amount of light absorbed by blood will also change periodically, and the periodic changing of the PPG signal is closely related to cardiac impulses and blood pressure change. The diastolic and systolic blood pressure data can be obtained by applying a well-trained artificial intelligence blood pressure prediction network composed of a Convolutional Neural Network (CNN) model and an Artificial Neural Network (ANN) model to the PPG signal.

BRIEF SUMMARY

The purpose of the disclosure is to provide a blood pressure prediction method and device fusing nominal photoplethysmography (PPG) signal data, electronic equipment, a computer program product and a computer-readable storage medium to overcome the defects of the prior art. By fusing the nominal PPG signal data with real-time PPG signal data, then using a well-trained CNN+ANN prediction network for predicting relative blood pressure data to perform blood pressure prediction on the fused data to obtain the relative blood pressure data, and then performing inverse deduction of absolute blood pressure data according to the relative relationship information that reflecting the relationship between the relative blood pressure data and the nominal blood pressure data to obtain the predicted blood pressure data. In this way, the prediction accuracy of an artificial intelligence blood pressure prediction network can be improved.

In order to achieve the above object, the first aspect of the embodiment of the disclosure provides a blood pressure prediction method fusing nominal PPG signal data, comprising:

acquiring the nominal PPG signal data and the corresponding nominal diastolic blood pressure data and nominal systolic blood pressure data;

acquiring real-time PPG signal data, a time length of the real-time PPG signal data being the same as that of the nominal PPG signal data;

performing input data preparation processing on a Convolutional Neural Network (CNN) model according to the nominal PPG signal data and the real-time PPG signal data to generate a CNN input four-dimensional tensor;

using the CNN model to perform multi-layer convolution pooling calculation on the CNN input four-dimensional tensor to generate a CNN output four-dimensional tensor;

performing input data preparation processing on an artificial neural network (ANN) model according to the CNN output four-dimensional tensor to generate an ANN input two-dimensional tensor;

using the ANN model to perform regression calculation on the ANN input two-dimensional tensor to generate an ANN output two-dimensional tensor;

performing blood pressure data calculation according to the nominal diastolic blood pressure data, the nominal systolic blood pressure data and the ANN output two-dimensional tensor to generate a blood pressure two-dimensional tensor; and when preset prediction type information is a first type, performing mean blood pressure data calculation according to the blood pressure two-dimensional tensor to generate diastolic blood pressure prediction data and systolic blood pressure prediction data, and when prediction type information is a second type, performing blood pressure data extraction processing on the blood pressure two-dimensional tensor to generate a diastolic blood pressure prediction data sequence and a systolic blood pressure prediction data sequence.

Preferably, performing input data preparation processing on a CNN model according to the nominal PPG signal data and the real-time PPG signal data to generate a CNN input four-dimensional tensor specifically comprises:

according to a preset sampling frequency, performing signal data sampling processing on the real-time PPG signal data to generate a real-time PPG data sequence, and performing signal data sampling processing on the nominal PPG signal data to generate a nominal PPG data sequence, a data length $L_1$ of the real-time PPG data sequence is the same as a data length $L_2$ of the nominal PPG data sequence;

according to a preset slot length, performing data slot division processing on the real-time PPG data sequence in sequence to obtain real-time PPG one-dimensional tensors, the number of which is the total number of real-time slots, and then fusing the real-time PPG one-dimensional tensors the number of which is the total number of real-time slots into one two-dimensional tensor to generate a real-time PPG two-dimensional tensor, wherein the total number of real-time slots=int($L_1$/slot length), int( ) is a rounding function, the shape of the real-time PPG one-dimensional tensor is $1 \times W_1$, the $W_1$ is a one-dimensional parameter of the real-time PPG one-dimensional tensor, and $W_1$=slot length, the shape of the real-time PPG two-dimensional tensor is $B_1 \times W_2$, the $B_1$ is a two-dimensional parameter of the real-time PPG two-dimensional tensor, and $B_1$=the total number of real-time slots, the $W_2$ is a one-dimensional parameter of the real-time PPG two-dimensional tensor, and $W_2=W_1$;

according to the slot length, performing data slot division processing on the nominal PPG data sequence in sequence to obtain nominal PPG one-dimensional tensors, the number of which is the total number of nominal slots, and then fusing the nominal PPG one-dimensional tensors the number of which is the total number of nominal slots into one two-dimensional tensor to generate a nominal PPG two-dimensional tensor, wherein the total number of nominal slots=int($L_2$/slot length), the shape of the nominal PPG one-dimensional tensor is $1 \times W_3$, the $W_3$ is a one-dimensional parameter of the nominal PPG one-dimensional tensor, and $W_3$=slot length, the shape of the nominal PPG two-dimensional tensor is $B_2 \times W_4$, the $B_2$ is a two-dimensional parameter of the nominal PPG two-dimensional tensor, and $B_2$=the total number of nominal slots, the $W_4$ is a one-dimensional parameter of the nominal PPG two-dimensional tensor, and $W_4=W_3$;

performing two-dimensional tensor fusion processing on the real-time PPG two-dimensional tensor and the nominal PPG two-dimensional tensor according to the sequence of nominal data following real-time data to generate a fused two-dimensional tensor, wherein the shape of the fused two-dimensional tensor is $B_3 \times W_5$, the $B_3$ is a two-dimensional parameter of the fused two-dimensional tensor, and $B_3=B_2=B_1$, the $W_5$ is a one-dimensional parameter of the fused two-dimensional tensor, and $W_5=W_2+W_4$, the fused two-dimensional tensor comprises the $B_3$ fused one-dimensional tensors, and the fused one-dimensional tensor is formed by splicing the corresponding real-time PPG one-dimensional tensor and the nominal PPG one-dimensional tensor according to the sequence of the nominal PPG one-dimensional tensor following the real-time PPG one-dimensional tensor; and according to a four-dimensional tensor input data format of the CNN model, raising the shape of the fused two-dimensional tensor from a two-dimensional tensor shape to a four-dimensional tensor shape to generate the CNN input four-dimensional tensor, wherein the shape of the CNN input four-dimensional tensor is $B_4 \times H_1 \times W_6 \times C_1$, the $B_4$ is a four-dimensional parameter of the CNN input four-dimensional tensor, and $B_4=B_3$, the $H_1$ is a three-dimensional parameter of the CNN input four-dimensional tensor, and $H_1=2$, the $W_6$ is a two-dimensional parameter of the CNN input four-dimensional tensor, and $W_6=W_5/2$, the $C_1$ is a one-dimensional parameter of the CNN input four-dimensional tensor, and $C_1=1$.

Preferably, using the CNN model to perform multi-layer convolution pooling calculation on the CNN input four-dimensional tensor to generate a CNN output four-dimensional tensor specifically comprises:

taking the CNN input four-dimensional tensor as a first input four-dimensional tensor, and then sending the first input four-dimensional tensor to a first convolutional network layer of the CNN model for first-layer convolution pooling calculation to generate a first output four-dimensional tensor; then, taking the first output four-dimensional tensor as a second input four-dimensional tensor, and sending the second input four-dimensional tensor to a second convolutional network layer of the CNN model for second-layer convolution pooling calculation to generate a second output four-dimensional tensor; and finally, taking a penultimate output four-dimensional tensor as a last input four-dimensional tensor, and sending the last input four-dimensional tensor to a last convolutional network layer of the CNN model for last-layer convolution pooling calculation to generate the CNN output four-dimensional tensor, wherein the CNN model comprises a plurality of convolutional network layers, the convolutional network layer comprises a convolution layer and a pooling layer, the shape of the CNN output four-dimensional tensor is $B_5 \times H_2 \times W_7 \times C_2$, the $B_5$ is a four-dimensional parameter of the CNN output four-dimensional tensor, and $B_5=B_4$, the $H_2$ is a three-dimensional parameter of the CNN output four-dimensional tensor, the $W_7$ is a two-dimensional parameter of the CNN output four-dimensional tensor, and the $C_2$ is a one-dimensional parameter of the CNN output four-dimensional tensor.

Further, sending the first input four-dimensional tensor to a first convolutional network layer of the CNN model for first-layer convolution pooling calculation to generate a first output four-dimensional tensor specifically comprises:

sending the first input four-dimensional tensor into a first convolution layer of the first convolutional network layer for first convolution calculation to generate a first convolution four-dimensional tensor, and sending the first convolution four-dimensional tensor into a first pooling layer of the first convolutional network layer for first pooling calculation to generate the first output four-dimensional tensor.

Preferably, performing input data preparation processing on an ANN model according to the CNN output four-dimensional tensor to generate an ANN input two-dimensional tensor specifically comprises:

according to a two-dimensional tensor input data format of the ANN model, reducing the shape of the CNN output four-dimensional tensor from a four-dimensional tensor shape to a two-dimensional tensor shape to generate the ANN input two-dimensional tensor, wherein the shape of the ANN input two-dimensional tensor is $B_6 \times W'_1$, the $B_6$ is a two-dimensional parameter of the ANN input two-dimensional tensor, and $B_6=B_5$, the $W'_1$ is a one-dimensional parameter of the ANN input two-dimensional tensor, and $W'_1=H_2*W_7*C_2$, the ANN input two-dimensional tensor comprises the $B_6$ ANN input one-dimensional tensors, the shape of the ANN input one-dimensional tensor is $1 \times W'_2$, the $W'_2$ is a one-dimensional parameter of the ANN input one-dimensional tensor, and $W'_2=W'_1$; and adding the nominal diastolic blood pressure data and the nominal systolic blood pressure data to the end of each ANN input one-dimensional tensor, wherein the shape of the ANN input one-dimensional tensor becomes $1 \times W'_3$, the $W'_3$ is a new one-dimensional parameter of the ANN input one-dimensional tensor, and $W'_3=W'_2+2=W'_1+2=H_2*W_7*C_2+2$, the shape of the ANN input two-dimensional tensor become $B_6 \times W_8$, the $W_8$ is a new one-dimensional parameter of the ANN input two-dimensional tensor, and $W_8=W'_3=H_2*W_7*C_2+2$.

Preferably, using the ANN model to perform regression calculation on the ANN input two-dimensional tensor to generate an ANN output two-dimensional tensor specifically comprises:

taking the ANN input two-dimensional tensor as a first input two-dimensional tensor, and then sending the first input two-dimensional tensor to a first fully connected layer of the ANN model for first-layer full connection calculation to generate a first output two-dimensional tensor; then, taking the first output two-dimensional tensor as a second input two-dimensional tensor, and sending the second input two-dimensional tensor to a second fully connected layer of the ANN model for second-layer full connection calculation to generate a second output two-dimensional tensor; and finally, taking a penultimate output two-dimensional tensor as a last input two-dimensional tensor, and sending the last input two-dimensional tensor to a last fully connected layer of the ANN model for last-layer full connection calculation to generate the ANN output two-dimensional tensor, wherein the ANN model comprises a plurality of fully connected layers, the shape of the ANN output two-dimensional tensor is $B_7 \times W_9$, the $B_7$ is a two-dimensional parameter of the ANN output two-dimensional tensor, and $B_7 = B_6$, the $W_9$ is a one-dimensional parameter of the ANN output two-dimensional tensor, and $W_9 = 2$, the ANN output two-dimensional tensor comprises the $B_7$ ANN output one-dimensional tensors, and the ANN output one-dimensional tensor comprises relative diastolic blood pressure data and relative systolic blood pressure data.

Preferably, performing blood pressure data calculation according to the nominal diastolic blood pressure data, the nominal systolic blood pressure data and the ANN output two-dimensional tensor to generate a blood pressure two-dimensional tensor specifically comprises:

when the preset relative relation information is a difference relation, using the nominal diastolic blood pressure data to perform diastolic blood pressure value increase processing on all the relative diastolic blood pressure data in the ANN output two-dimensional tensor, using the nominal systolic blood pressure data to perform systolic blood pressure value increase processing on all the relative systolic blood pressure data in the ANN output two-dimensional tensor, and then, taking the ANN output two-dimensional tensor after the pressure value increasing process as the blood pressure two-dimensional tensor, wherein the shape of the blood pressure two-dimensional tensor is $B_8 \times W_{10}$, the $B_8$ is a two-dimensional parameter of the blood pressure two-dimensional tensor, and $B_8 = B_7$, the $W_{10}$ is a one-dimensional parameter of the blood pressure two-dimensional tensor, and $W_{10} = 2$, the blood pressure two-dimensional tensor comprises the $B_8$ blood pressure one-dimensional tensors, the blood pressure one-dimensional tensor comprises diastolic blood pressure data and systolic blood pressure data, the diastolic blood pressure data is the sum of the corresponding relative diastolic blood pressure data and the nominal diastolic blood pressure data, and the systolic blood pressure data is the sum of the corresponding relative systolic blood pressure data and the nominal systolic blood pressure data.

Preferably, when preset prediction type information is a first type, performing mean blood pressure data calculation according to the blood pressure two-dimensional tensor to generate diastolic blood pressure prediction data and systolic blood pressure prediction data, and when prediction type information is a second type, performing blood pressure data extraction processing on the blood pressure two-dimensional tensor to generate a diastolic pressure prediction data sequence and a systolic pressure prediction data sequence specifically comprise:

when the prediction type information is the first type, calculating a mean value of all the diastolic blood pressure data in the blood pressure two-dimensional tensor to generate the diastolic blood pressure prediction data, and calculating a mean value of all the systolic blood pressure data in the blood pressure two-dimensional tensor to generate the systolic blood pressure prediction data; and when the prediction type information is the second type, sequentially extracting the diastolic blood pressure data from the blood pressure two-dimensional tensor to form the diastolic blood pressure prediction data sequence, and extracting the systolic blood pressure data from the blood pressure two-dimensional tensor to form the systolic blood pressure prediction data sequence.

The second aspect of the embodiment of the disclosure provides a blood pressure prediction device fusing nominal PPG signal data, comprising:

an acquisition module for acquiring nominal PPG signal data and corresponding nominal diastolic blood pressure data and nominal systolic blood pressure data, and acquiring real-time PPG signal data, wherein a time length of the real-time PPG signal data being the same as that of the nominal PPG signal data;

an artificial intelligence calculation module for performing input data preparation processing on a CNN model according to the nominal PPG signal data and the real-time PPG signal data to generate a CNN input four-dimensional tensor, using the CNN model to perform multi-layer convolution pooling calculation on the CNN input four-dimensional tensor to generate a CNN output four-dimensional tensor, performing input data preparation processing on an ANN model according to the CNN output four-dimensional tensor to generate an ANN input two-dimensional tensor, and using the ANN model to perform regression calculation on the ANN input two-dimensional tensor to generate an ANN output two-dimensional tensor; and a blood pressure prediction module for performing blood pressure data calculation according to the nominal diastolic blood pressure data, the nominal systolic blood pressure data and the ANN output two-dimensional tensor to generate a blood pressure two-dimensional tensor, performing mean blood pressure data calculation according to the blood pressure two-dimensional tensor to generate diastolic blood pressure prediction data and systolic blood pressure prediction data when preset prediction type information is a first type, and performing blood pressure data extraction processing on the blood pressure two-dimensional tensor to generate a diastolic blood pressure prediction data sequence and a systolic blood pressure prediction data sequence when prediction type information is a second type.

The third aspect of the embodiment of the disclosure provides electronic equipment, comprising a memory, a processor and a transceiver.

The processor is configured to be coupled with the memory, and read and execute instructions in the memory, so as to implement the method steps in the first aspect.

The transceiver is coupled with the processor, and the processor controls the transceiver to send and receive messages.

The fourth aspect of the embodiment of the disclosure provides a computer program product, which comprises computer program code that, when executed by a computer, causes the computer to perform the method described in the first aspect.

The fifth aspect of the embodiment of the disclosure provides a computer-readable storage medium, which stores computer instructions that, when executed by a computer, cause the computer to execute the method described in the first aspect.

The embodiment of the disclosure provides a blood pressure prediction method and device fusing nominal PPG signal data, electronic equipment, a computer program product and a computer-readable storage medium. Firstly, the nominal PPG signal data and corresponding nominal blood pressure data (nominal diastolic blood pressure data and nominal systolic blood pressure data) of a test object are obtained, then a well-trained CNN+ANN artificial intelligence blood pressure prediction network for predicting relative blood pressure data is used to perform blood pressure prediction operation on the real-time PPG signal and nominal PPG signal of the test object to obtain relative blood pressure data (relative diastolic blood pressure data and relative systolic blood pressure data), and then absolute blood pressure data calculation is performed on the nominal blood pressure data and the relative blood pressure data according to relative relationship information to obtain the final blood pressure data. In this way, the prediction accuracy of an artificial intelligence blood pressure prediction network is improved.

DETAILED DESCRIPTION

Figure 1:
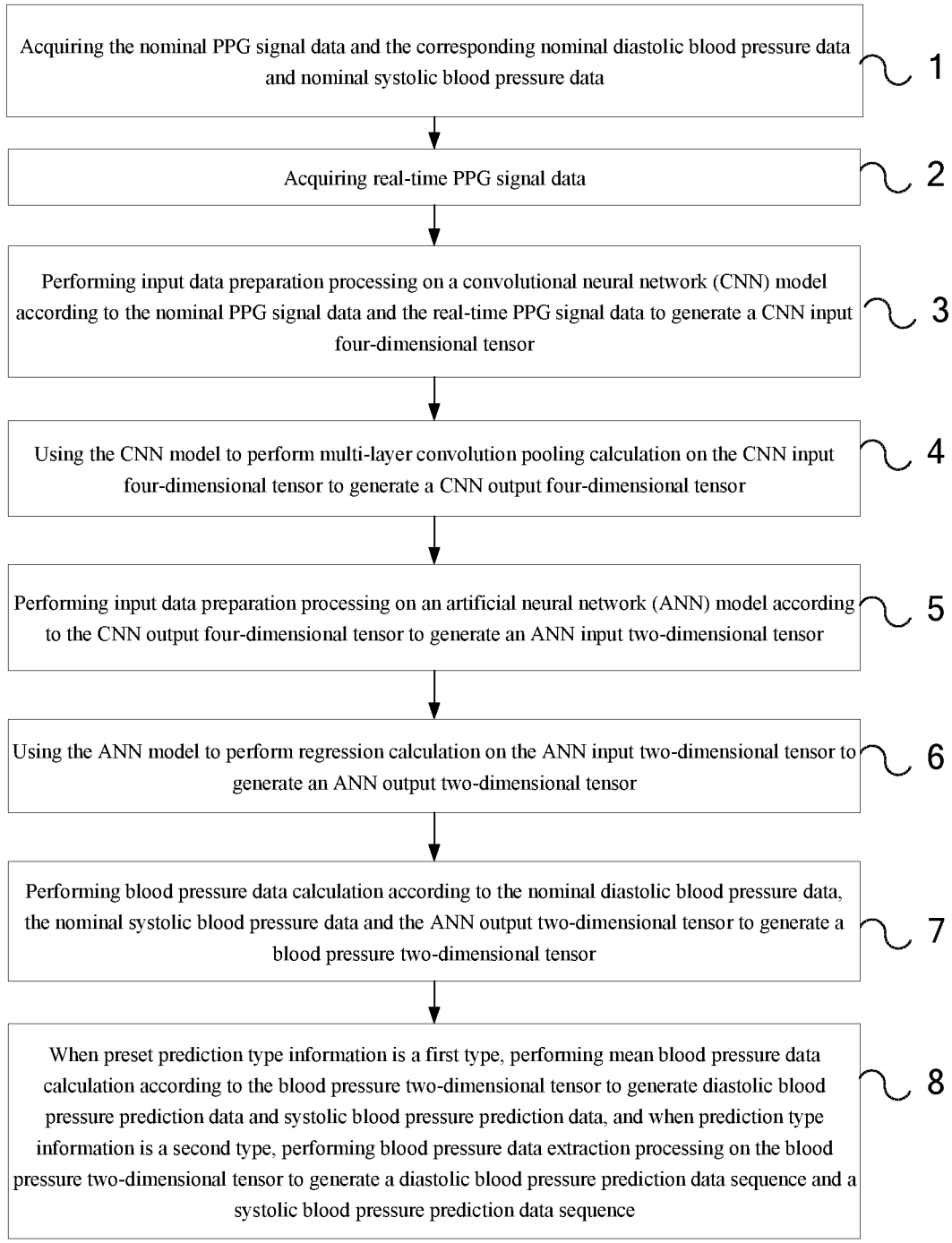
FIG. 1 is a flowchart of a blood pressure prediction method fusing nominal photoplethysmography (PPG) signal data provided in the first embodiment of the disclosure.

In order to make the object, technical solution and advantages of the disclosure clearer, the disclosure will be described in further detail below with reference to the accompanying drawings. Obviously, the described embodiments are only a part of the embodiments of the present invention, but not all of them. Based on the embodiments of the disclosure, all other embodiments obtained by those skilled in the art without creative labor are within the scope of the invention.

Before the embodiment of the disclosure is described in detail, the structures and data formats of CNN and ANN in the artificial intelligence blood pressure prediction network mentioned above are briefly described.

A convolutional neural network (CNN) is one of the core networks in the field of feature recognition. When CNN is applied to the field of blood pressure feature recognition, feature extraction calculation is performed on one-dimensional PPG signal data, and after performing convolution operation and pooling operation on input original PPG signal data, reserves the feature data conforming to the characteristics of PPG signals for other networks to learn.

The CNN model mentioned herein is a CNN model trained through feature extraction, and it is composed of multiple convolutional network layers, each of which is composed of a convolution layer and a pooling layer. The convolution layer is responsible for feature extraction calculation of the input data of the CNN model, the pooling layer performs down sampling operation to the extraction results of the convolution layer, and output data of each convolutional network layer will be used as input data of the next convolutional network layer. Here, the input data and output data of each convolutional network layer are in the form of four-dimensional tensors: the input four-dimensional tensor (in the shape of $X_{i4} \times X_{i3} \times X_{i2} \times X_{i1}$) and the output four-dimensional tensor (in the shape of $X_{o4} \times X_{o3} \times X_{o2} \times X_{o1}$), wherein $X_{i4}$, $X_{i3}$, $X_{i2}$ and $X_{i1}$ are four, three, two and one-dimensional parameters of the input four-dimensional tensor, respectively, and $X_{o4}$, $X_{o3}$, $X_{o2}$ and $X_{o1}$ are four, three, two and one-dimensional parameters of the output four-dimensional tensor, respectively. After the calculation of each convolutional network layer, the shape of the output data relative to the shape of the input data, the variation rule of the dimensional parameters are as follows: (1) $X_{o4}$ vs $X_{i4}$, the 4-dimensional parameter (corresponding to the total number of slots of the PPG signal data in this embodiment) does not change; (2) $X_{o3}$ and $X_{o2}$ vs $X_{i3}$ and $X_{i2}$, the three-dimensional and two-dimensional parameters change, and the change is related to the size of a convolution kernel and the setting of a sliding step of each convolution layer, as well as the size of a pooling window and a sliding step of the pooling layer; and (3) $X_{o1}$ vs $X_{i1}$, the change of the one-dimensional parameter is related to a selected output space dimension (the number of convolution kernels) in the convolution layer.

An artificial neural network (ANN) refers to a complex network structure formed by a large number of interconnected neurons (nodes), which is some kind of abstraction, simplification and simulation of the organization structure and operation mechanism of the human brain. The ANN uses a mathematical model to simulate neuron activities, which is an information processing system based on imitating the structure and function of a brain neural network. The common application of the ANN is regression calculation of data. The ANN model mentioned in the disclosure is an ANN model that has been trained by regression. Specifically, the ANN model is composed of multiple fully connected layers. Wherein, each fully connected layer includes a plurality of nodes, and each node is connected with all nodes of the previous layer so that summarize the node data extracted from the previous layer and perform the node calculation once, and take the calculation result as a value of the current node, and wait for the node of the next fully connected layer to connect and obtain it. The node calculation here is also called full connection calculation, comprising node connection calculation and activation calculation. Generally, the activation function uses the Rectified Linear Unit (ReLU) function in most cases, but other functions can be used to complete the calculation. Here, the input data and output data of each fully connected layer are in the form of two-dimensional tensors: input two-dimensional tensor (in the shape of $Y_{i2} \times Y_{i1}$) and output two-dimensional tensor (in the shape of $Y_{o2} \times Y_{o1}$), wherein $Y_{i2}$ and $Y_{i1}$ are the two-dimensional and one-dimensional parameters of the input two-dimensional tensor, and $Y_{o2}$ and $Y_{o1}$ are the two-dimensional and one-dimensional parameters of the output two-dimensional tensor. After the calculation of each fully connected layer, the shape of the output data relative to the shape of the input data, the variation rule of the dimensional parameters are as follows: (1) $Y_{o2}$ vs $Y_{i2}$, the 2-dimensional parameter (corresponding to the total number of slots of the PPG signal data in this embodiment) does not change; and (2) $Y_{o1}$ vs $Y_{i1}$, the change of the one-dimensional parameter is related to the total number of nodes in the fully connected layer. Specifically, $Y_{o1}$ of the last fully connected layer in the embodiment of the disclosure is 2. According to the embodiment of the disclosure, the shape of a two-dimensional tensor finally output by the ANN model is the total number of slots×2, and the two-dimensional tensor comprises one-dimensional tensors, the number of which is the total number of slots, and each one-dimensional tensor corresponds to one slot and comprises two blood pressure data related to the corresponding slots: relative diastolic blood pressure data and relative systolic blood pressure data.

In the embodiment of the present disclosure, because the output data of the CNN model need to be input into the ANN model, an output result of the CNN model needs to be reduced from the output four-dimensional tensor shape $(X_{o4} \times X_{o3} \times X_{o2} \times X_{o1})$ to the input two-dimensional tensor shape $(Y_{i2} \times Y'_{i1})$ of the ANN model, wherein $Y'_{i1}$ is the one-dimensional parameter of the input two-dimensional tensor, $Y_{i2}=X_{o4}$, and $Y'_{i1}=X_{o3}*X_{o2}*X_{o1}$. Here, the input two-dimensional tensor comprises $Y_{i2}$ number of input one-dimensional tensors. In order to further improve the calculation accuracy of the ANN model, the embodiment of the present disclosure adds two data to an end of each input one-dimensional tensor: nominal diastolic blood pressure data and nominal systolic blood pressure data, thereby changing the shape of the input one-dimensional tensor from $1 \times Y'_{i1}$ to $1 \times (Y'_{i1}+2)$, and accordingly, the shape of the input two-dimensional tensor is also changed from $Y_{i2} \times Y'_{i1}$ to $Y_{i2} \times Y_{i1}$, wherein $Y_{i1}=Y'_{i1}+2=X_{o3}*X_{o2}*X_{o1}+2$.

Before the embodiment of the disclosure is described in detail, CNN and ANN application characteristics in the artificial intelligence blood pressure prediction network in the embodiment of the disclosure are briefly described.

A conventional artificial intelligence blood pressure prediction network directly segments real-time PPG signal data (real-time PPG signal data collected from a test object that need blood pressure prediction) (the reason why the PPG signal data are segmented into multiple PPG signal data slots is because an input length of the CNN model is limited), then uses the data as the input data of the CNN model, performs PPG signal feature extraction by means of the CNN model to obtain feature data, and then inputs the feature data into the ANN model, and performs regression calculation to obtain the absolute systolic blood pressure and diastolic blood pressure data corresponding to each PPG signal data slot. In practical application, it was found that similar PPG signal data may be collected from different test subjects. If the above model is used, the absolute systolic blood pressure and diastolic blood pressure data of different test subjects calculated are almost the same. However, in reality, it was found that due to individual differences (such as gender, age, height, weight, arm span, BMI, body temperature, whether the test object had coffee or strong tea before the test, or whether the test object exercised before the test), even if the collected PPG signal data are similar, blood pressure states may be different for different people.

Therefore, in order to improve the prediction accuracy of the artificial intelligence blood pressure prediction network, the embodiment of the present disclosure makes some adjustments to the CNN model and the ANN model of the artificial intelligence blood pressure prediction network, respectively. The adjusted CNN model receives real-time PPG signal data as well as nominal PPG signal data at the same time, and the CNN model finally outputs relative feature data calculated according to a specific relative relationship between the real-time PPG signal data and the nominal PPG signal data, instead of absolute feature data of the real-time PPG signal data. Here, the specific relative relationship may be difference, ratio, logarithmic ratio, exponential ratio, etc. The input data of the adjusted ANN model changes from the absolute feature data to the relative feature data, and the output data changes from the absolute blood pressure data to the relative blood pressure data. Here, the so-called nominal PPG signal data are reference data that are specially collected for the test object and have the same time length as the real-time PPG signal data. While the nominal PPG signal data are collected, the nominal systolic blood pressure and the diastolic blood pressure data corresponding to the nominal PPG signal data are obtained through blood pressure measuring equipment. After relative systolic blood pressure data and diastolic blood pressure data are obtained from the output data of the ANN model, the absolute blood pressure can be reversely deduced according to the specific relative relationship (such as difference, ratio, logarithmic ratio, exponential ratio, etc.), combined with the nominal diastolic blood pressure data and nominal systolic blood pressure data, and finally predicted systolic blood pressure and diastolic blood pressure data corresponding to the real-time PPG signal data can be obtained.

By using the artificial intelligence blood pressure prediction network (CNN+ANN) that fuses the nominal PPG signal data with the real-time PPG signal data, when predicting the real-time PPG signal data collected from different objects, even if the real-time data are similar, the obvious relative differences can be obtained because of the differences between the nominal PPG signal data, so that the differences between the finally predicted blood pressure data will be obvious. Therefore, the problem of measurement inaccuracy of the conventional prediction network is solved, and the prediction accuracy of the artificial intelligence blood pressure prediction network is further improved.

The first embodiment of the present disclosure provides a blood pressure prediction method fusing nominal PPG signal data, which uses an artificial intelligence blood pressure prediction network (CNN+ANN) for predicting relative blood pressure data to perform prediction operations on input data that fused nominal PPG signal data with real-time PPG signal data to obtain relative blood pressure data, and then performs inverse deduction for absolute blood pressure data according to the specific relative relationship between nominal blood pressure data and relative blood pressure data to obtain the predicted blood pressure data corresponding to a real-time PPG signal. By the method provided in the first embodiment of the present disclosure, the prediction accuracy of the artificial intelligence blood pressure prediction network can be improved.

FIG. 1 is a diagram of a blood pressure prediction method fusing nominal PPG signal data provided in the first embodiment of the disclosure, As shown in the FIG. 1, the method mainly comprises the following steps.

Step 1, acquiring the nominal PPG signal data and the corresponding nominal diastolic blood pressure data and nominal systolic blood pressure data.

Specifically, equipment can acquire the nominal PPG signal data and the nominal diastolic blood pressure data and nominal systolic blood pressure data corresponding to the nominal PPG signal data from a local storage medium, and the equipment can also acquire the nominal PPG signal data, the nominal diastolic blood pressure data and the nominal systolic blood pressure data from storage media of other terminal equipment, servers or databases connected to the equipment.

Here, the equipment is specifically a terminal equipment or a server for implementing the method provided by the embodiment of the disclosure, the nominal PPG signal data is a piece of PPG signal data collected in advance for a test object, the corresponding nominal diastolic blood pressure data and nominal systolic blood pressure data are the actual blood pressure data obtained by measuring the blood pressure of the test object with blood pressure measuring equipment while the nominal PPG signal data are collected.

For example, the acquired nominal PPG signal data has a length of 10 seconds, corresponding to the nominal diastolic blood pressure data of 74 mmHg and the nominal systolic blood pressure data of 113 mmHg.

Step 2, acquiring real-time PPG signal data,
wherein a time length of the real-time PPG signal data is the same as that of the nominal PPG signal data.

Specifically, the equipment can perform real-time PPG signal collection and data sampling on the test object with its own PPG signal collection device, so as to obtain the real-time PPG signal data, and the equipment can also perform real-time PPG signal collection and data sampling on the test object through a PPG signal collection device connected to itself, so as to obtain the real-time PPG signal data.

For example, the acquired real-time PPG signal data has a length of 10 seconds, which is the same as the length of the nominal PPG signal data.

Step 3, performing input data preparation processing on a CNN model according to the nominal PPG signal data and the real-time PPG signal data to generate a CNN input four-dimensional tensor.

Specifically comprises the following steps: Step 31, according to a preset sampling frequency, performing signal data sampling processing on the real-time PPG signal data to generate a real-time PPG data sequence, and performing signal data sampling processing on the nominal PPG signal data to generate a nominal PPG data sequence.

Wherein the data length $L_1$ of the real-time PPG data sequence is the same as the data length $L_2$ of the nominal PPG data sequence.

Here, the sampling frequency is stored in the local storage medium of the equipment.

For example, if the real-time and nominal PPG signal data both have a length of 10 seconds, and a sampling frequency threshold is 125 Hz, then data lengths of the real-time and nominal PPG data sequences are $L_1=L_2=10*125=1250$, the real-time PPG data sequence is specifically a real-time PPG data sequence [1250], and the nominal PPG data sequence is specifically a nominal PPG data sequence [1250].

Step 32, according to a preset slot length, performing data slot division processing on the real-time PPG data sequence in sequence to obtain real-time PPG one-dimensional tensors, the number of which is the total number of real-time slots, and then fusing the real-time PPG one-dimensional tensors the number of which is the total number of real-time slots into one two-dimensional tensor to generate a real-time PPG two-dimensional tensor.

Wherein the total number of real-time slots=int($L_1$/slot length), int( ) is a rounding function, the shape of the real-time PPG one-dimensional tensor is $1 \times W_1$, the $W_1$ is a one-dimensional parameter of the real-time PPG one-dimensional tensor, and $W_1$=slot length, the shape of the real-time PPG two-dimensional tensor is $B_1 \times W_2$, the $B_1$ is a two-dimensional parameter of the real-time PPG two-dimensional tensor, and $B_1$=the total number of real-time slots, the $W_2$ is a one-dimensional parameter of the real-time PPG two-dimensional tensor, and $W_2=W_1$.

Here, the slot length is stored in the local storage medium of the equipment.

Here, the value of the slot length is determined by the length of the input data of the CNN model, and slot division is performed by a sequential slot division method, so the data between adjacent slots do not coincide.

For example, if the slot length is 250, data slot division processing is performed on the real-time PPG data sequence [1250] in sequence, then $B_1$=the total number of real-time slots=int(1250/250)=5, $W_2=W_1=250$, and the shape of the real-time PPG two-dimensional tensor is specifically 5×250, which is expressed here as the real-time PPG two-dimensional tensor [5,250].

Step 33, according to the slot length, performing data slot division processing on the nominal PPG data sequence in sequence to obtain nominal PPG one-dimensional tensors, the number of which is the total number of nominal slots, and then fusing the nominal PPG one-dimensional tensors into one two-dimensional tensor to generate a nominal PPG two-dimensional tensor, wherein the number of the nominal PPG one-dimensional tensors is the total number of nominal slots.

Wherein the total number of nominal slots=int($L_2$/slot length), the shape of the nominal PPG one-dimensional tensor is $1 \times W_3$, the $W_3$ is a one-dimensional parameter of the nominal PPG one-dimensional tensor, and $W_3$=slot length, the shape of the nominal PPG two-dimensional tensor is $B_2 \times W_4$, the $B_2$ is a two-dimensional parameter of the nominal PPG two-dimensional tensor, and $B_2$=the total number of nominal slots, the $W_4$ is a one-dimensional parameter of the nominal PPG two-dimensional tensor, and $W_4=W_3$.

For example, if the slot length is 250, data slot division processing is performed on the nominal PPG data sequence [1250] in sequence, then $B_2$=the total number of nominal slots=int(1250/250)=5, $W_4=W_3=250$, and the shape of the nominal PPG two-dimensional tensor is specifically 5×250, which is expressed here as the nominal PPG two-dimensional tensor [5,250].

Step 34, performing two-dimensional tensor fusion processing on the real-time PPG two-dimensional tensor and the nominal PPG two-dimensional tensor according to the sequence of nominal data following real-time data to generate a fused two-dimensional tensor.

Wherein the shape of the fused two-dimensional tensor is $B_3 \times W_5$, the $B_3$ is a two-dimensional parameter of the fused two-dimensional tensor, and $B_3=B_2=B_1$, the $W_5$ is a one-dimensional parameter of the fused two-dimensional tensor, and $W_5=W_2+W_4$, the fused two-dimensional tensor comprises the $B_3$ fused one-dimensional tensors, and the fused one-dimensional tensor is formed by splicing the corresponding real-time PPG one-dimensional tensor and the nominal PPG one-dimensional tensor according to the sequence of the nominal PPG one-dimensional tensor following the real-time PPG one-dimensional tensor.

For example, the data of the real-time PPG two-dimensional tensor [5,250] are specifically $\{(Z_{1,1}, \ldots Z_{1,250}), (Z_{2,1}, \ldots Z_{2,250}), (Z_{3,1}, \ldots Z_{3,250}), (Z_{4,1}, \ldots Z_{4,250}), (Z_{5,1}, \ldots Z_{5,250})\}$, wherein $(Z_{1,1}, \ldots Z_{1,250})$, $(Z_{2,1}, \ldots Z_{2,250})$, $(Z_{3,1}, \ldots Z_{3,250})$, $(Z_{4,1}, \ldots Z_{4,250})$, $(Z_{5,1}, \ldots Z_{5,250})$ are the data of the first, second, third, fourth and fifth real-time PPG one-dimensional tensors in the real-time PPG two-dimensional tensor, respectively.

The data of the nominal PPG two-dimensional tensor [5,250] are specifically $\{(D_{1,1}, \ldots D_{1,250}),(D_{2,1}, \ldots D_{2,250}),(D_{3,1}, \ldots D_{3,250}),(D_{4,1}, \ldots D_{4,250}),(D_{5,1}, \ldots D_{5,250})\}$, wherein $(D_{1,1}, \ldots D_{1,250})$, $(D_{2,1}, \ldots D_{2,250})$, $(D_{3,1}, \ldots D_{3,250})$, $(D_{4,1}, \ldots D_{4,250})$, $(D_{5,1}, \ldots D_{5,250})$ are the data of the first, second, third, fourth and fifth nominal PPG one-dimensional tensors in the nominal PPG two-dimensional tensor, respectively.

Then, after two-dimensional tensor fusion processing of the real-time PPG two-dimensional tensor [5,250] and the nominal PPG two-dimensional tensor [5,250], $B_3=B_2=B_1=5$, $W_5=W_2+W_4=250+250=500$, and the shape of the fused two-dimensional tensor is 5×500, which is expressed here as the fused two-dimensional tensor [5, 500].

The fused two-dimensional tensor [5,500] comprises five fused one-dimensional tensors, and each fused one-dimensional tensor comprises $W_5=W_2+W_4=250+250=500$ data, among which the first 250 data are the data of the corresponding real-time PPG one-dimensional tensors in the real-time PPG two-dimensional tensor [5,250], and the last 250 data are the data of the corresponding nominal PPG one-dimensional tensors in the nominal PPG two-dimensional tensor [5,250].

That is, the data format of the fused two-dimensional tensor should be:

$$\{(Z_{1,1}, \ldots Z_{1,250}, D_{1,1}, \ldots D_{1,250}),(Z_{2,1}, \ldots Z_{2,250}, D_{2,1}, \ldots D_{2,250}),(Z_{3,1}, \ldots Z_{3,250}, D_{3,1}, \ldots D_{3,250}),(Z_{4,1}, \ldots Z_{4,250}, D_{4,1}, \ldots D_{4,250}),(Z_{5,1}, \ldots Z_{5,250}, D_{5,1}, \ldots D_{5,250})\},$$

Wherein, $(Z_{1,1}, \ldots Z_{1,250}, D_{1,1}, \ldots D_{1,250})$, $(Z_{2,1}, \ldots Z_{2,250}, D_{2,1}, \ldots D_{2,250})$, $(Z_{3,1}, \ldots Z_{3,250}, D_{3,1}, \ldots D_{3,250})$, $(Z_{4,1}, \ldots Z_{4,250}, D_{4,1}, \ldots D_{4,250})$, $(Z_{5,1}, \ldots Z_{5,250}, D_{5,1}, \ldots D_{5,250})$ are the data of the first, second, third, fourth and fifth fused one-dimensional tensors in the fused two-dimensional tensor, respectively.

Step 35, according to a four-dimensional tensor input data format of the CNN model, raising the shape of the fused two-dimensional tensor from a two-dimensional tensor shape to a four-dimensional tensor shape to generate the CNN input four-dimensional tensor.

Wherein the shape of the CNN input four-dimensional tensor is $B_4 \times H_1 \times W_6 \times C_1$, the $B_4$ is a four-dimensional parameter of the CNN input four-dimensional tensor, and $B_4=B_3$, the $H_1$ is a three-dimensional parameter of the CNN input four-dimensional tensor, and $H_1=2$, the $W_6$ is a two-dimensional parameter of the CNN input four-dimensional tensor, and $W_6=W_5/2$, the $C_1$ is a one-dimensional parameter of the CNN input four-dimensional tensor, and $C_1=1$.

Here, the shape of the fused two-dimensional tensor is raised from the two-dimensional tensor shape to the four-dimensional tensor shape, and the process only resets the tensor shape without destroying the actual data order in the tensor.

For example, the fused two-dimensional tensor [5,500] is raised from the two-dimensional tensor shape to the four-dimensional tensor shape, $B_4=B_3=5$, $W_6=W_5/2=5/2=250$, and the shape of the obtained CNN input four-dimensional tensor is 5×2×250×1, which is represented here as the CNN input four-dimensional tensor [5,2,250,1].

Step 4, using the CNN model to perform multi-layer convolution pooling calculation on the CNN input four-dimensional tensor to generate a CNN output four-dimensional tensor.

Which specifically comprises: taking the CNN input four-dimensional tensor as a first input four-dimensional tensor, and then sending the first input four-dimensional tensor to a first convolutional network layer of the CNN model for first-layer convolution pooling calculation to generate a first output four-dimensional tensor. Then, taking the first output four-dimensional tensor as a second input four-dimensional tensor, and sending the second input four-dimensional tensor to a second convolutional network layer of the CNN model for second-layer convolution pooling calculation to generate a second output four-dimensional tensor. And finally, taking a penultimate output four-dimensional tensor as a last input four-dimensional tensor, and sending the last input four-dimensional tensor to a last convolutional network layer of the CNN model for last-layer convolution pooling calculation to generate the CNN output four-dimensional tensor.

Wherein the CNN model comprises a plurality of convolutional network layers, the convolutional network layer comprises a convolution layer and a pooling layer, the shape of the CNN output four-dimensional tensor is $B_5 \times H_2 \times W_7 \times C_2$, the $B_5$ is a four-dimensional parameter of the CNN output four-dimensional tensor, and $B_5=B_4$, the $H_2$ is a three-dimensional parameter of the CNN output four-dimensional tensor, the $W_7$ is a two-dimensional parameter of the CNN output four-dimensional tensor, and the $C_2$ is a one-dimensional parameter of the CNN output four-dimensional tensor.

Wherein, sending the first input four-dimensional tensor to a first convolutional network layer of the CNN model for first-layer convolution pooling calculation to generate a first output four-dimensional tensor specifically comprises sending the first input four-dimensional tensor into a first convolution layer of the first convolutional network layer for first convolution calculation to generate a first convolution four-dimensional tensor, and sending the first convolution four-dimensional tensor into a first pooling layer of the first convolutional network layer for first pooling calculation to generate the first output four-dimensional tensor.

Figure 2A:
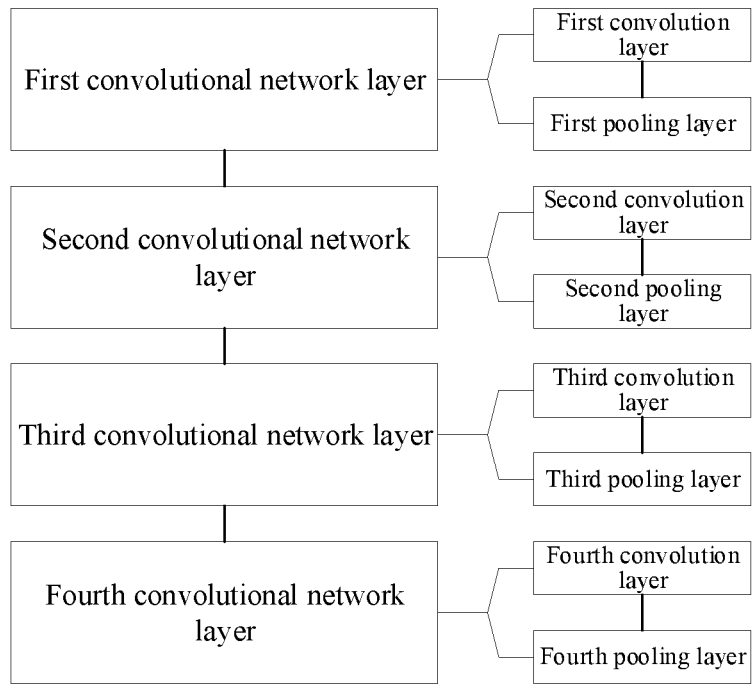
FIG. 2A is a structural schematic diagram of a convolutional neural network provided in the first embodiment of the disclosure.

For example, FIG. 2A is a structural diagram of a CNN provided in the first embodiment of the disclosure, as shown in the FIG. 2A, the total number of layers of the CNN model is four, then the following steps are performed.

Taking the CNN input four-dimensional tensor as the first input four-dimensional tensor, sending the first input four-dimensional tensor into a first convolution layer of the first convolutional network layer of the CNN model for first convolution calculation to generate a first convolution four-dimensional tensor, and sending the first convolution four-dimensional tensor into a first pooling layer of the first convolutional network layer for first pooling calculation to generate the first output four-dimensional tensor.

Taking the first output four-dimensional tensor as the second input four-dimensional tensor, sending the second input four-dimensional tensor into a second convolution layer of the second convolutional network layer of the CNN model for second convolution calculation to generate a second convolution four-dimensional tensor, and sending the second convolution four-dimensional tensor into a second pooling layer of the second convolutional network layer for second pooling calculation to generate the second output four-dimensional tensor.

Taking the second output four-dimensional tensor as a third input four-dimensional tensor, sending the third input four-dimensional tensor into a third convolution layer of a third convolutional network layer of the CNN model for third convolution calculation to generate a third convolution four-dimensional tensor, and sending the third convolution four-dimensional tensor into a third pooling layer of the third convolutional network layer for third pooling calculation to generate a third output four-dimensional tensor; and Taking the third output four-dimensional tensor as the fourth input four-dimensional tensor, sending the fourth input four-dimensional tensor into a fourth convolution layer of a fourth convolutional network layer of the CNN model for fourth convolution calculation to generate a fourth convolution four-dimensional tensor, and sending the fourth convolution four-dimensional tensor into a fourth pooling layer of the fourth convolutional network layer for fourth pooling calculation to generate a fourth output four-dimensional tensor; here, the fourth output four-dimensional tensor is the finally output CNN output four-dimensional tensor.

As can be seen from the above, in the CNN model, after each convolution layer or pooling layer, the shape of the input data will change, but the four-dimensional tensor form does not change, and the four-dimensional parameter (total number of slots) will not change. The change of the three-dimensional and second-dimensional parameters is related to the size of a convolution kernel and the setting of a sliding step of each convolution layer, as well as the size of a pooling window and a sliding step of the pooling layer, and the change of the one-dimensional parameter is related to a selected output space dimension (the number of convolution kernels) in the convolution layer. In practical application, the setting of the number of layers in the network and various parameters of each layer should be constantly revised according to experience and experimental results.

Step 5, performing input data preparation processing on an artificial neural network (ANN) model according to the CNN output four-dimensional tensor to generate an ANN input two-dimensional tensor.

Which specifically comprises the following steps: Step 51, according to a two-dimensional tensor input data format of the ANN model, reducing the shape of the CNN output four-dimensional tensor from a four-dimensional tensor shape to a two-dimensional tensor shape to generate the ANN input two-dimensional tensor, wherein the shape of the ANN input two-dimensional tensor is $B_6 \times W'_1$, the $B_6$ is a two-dimensional parameter of the ANN input two-dimensional tensor, and $B_6=B_5$, the $W'_1$ is a one-dimensional parameter of the ANN input two-dimensional tensor, and $W'_1=H_2*W_7*C_2$, the ANN input two-dimensional tensor comprises the $B_6$ ANN input one-dimensional tensors, the shape of the ANN input one-dimensional tensor is $1 \times W'_2$, the $W'_2$ is a one-dimensional parameter of the ANN input one-dimensional tensor, and $W'_2=W'_1$.

Here, reducing the shape of the CNN output four-dimensional tensor from the four-dimensional tensor shape to the second-dimensional tensor shape is actually reducing the CNN output four-dimensional tensor from four-dimensional to two-dimensional, and the process only resets the tensor shape without destroying the actual data order in the tensor.

For example, if the shape of the CNN output four-dimensional tensor is $5 \times 2 \times 20 \times 64$, then $B_6=B_5=5$, $W_8=H_2*W_7*C_2=2*20*64=2560$, and the shape of the ANN input two-dimensional tensor should be $5 \times 2560$, which is represented here as the ANN input two-dimensional tensor [5,2560]. Correspondingly, the ANN input two-dimensional tensor comprises five ANN input one-dimensional tensors, and the shape of the ANN input one-dimensional tensor should be $1 \times 2560$, which is represented here as the ANN input one-dimensional tensor [2560].

Step 52, adding the nominal diastolic blood pressure data and the nominal systolic blood pressure data to an end of each ANN input one-dimensional tensor, wherein the shape of the ANN input one-dimensional tensor becomes $1 \times W'_3$, the $W'_3$ is a one-dimensional parameter of the ANN input one-dimensional tensor, and $W'_3=W'_2+2=W'_1+2=H_2*W_7*C_2+2$, the shape of the ANN input two-dimensional tensor become $B_6 \times W_8$, the $W_8$ is a new one-dimensional parameter of the ANN input two-dimensional tensor, and $W_8=W'_3=H_2*W_7*C_2+2$.

Here, two data, that is, the nominal diastolic blood pressure data and the nominal systolic blood pressure data are added to an end of each ANN input one-dimensional tensor, so as to improve the calculation accuracy of the ANN model, and after data addition, the shape of the ANN input one-dimensional tensor is changed from $1 \times W'_2$ to $1 \times W'_3$, and accordingly, the shape of the ANN input two-dimensional tensor is changed from $B_6 \times W'_1$ to $B_6 \times W_8$.

For example, the shape of the ANN input two-dimensional tensor before data addition is $5 \times 2560$, and the shape of the ANN input one-dimensional tensor before data addition is $1 \times 2560$, and after data addition, the shape of the ANN input one-dimensional tensor becomes $1 \times 2562$, and the shape of the ANN input two-dimensional tensor becomes $5 \times 2562$, which is represented here as the ANN input two-dimensional tensor [5,2562].

Step 6, using the ANN model to perform regression calculation on the ANN input two-dimensional tensor to generate an ANN output two-dimensional tensor.

Specifically comprising: taking the ANN input two-dimensional tensor as a first input two-dimensional tensor, and then sending the first input two-dimensional tensor to a first fully connected layer of the ANN model for first-layer full connection calculation to generate a first output two-dimensional tensor; then, taking the first output two-dimensional tensor as a second input two-dimensional tensor, and sending the second input two-dimensional tensor to a second fully connected layer of the ANN model for second-layer full connection calculation to generate a second output two-dimensional tensor; and finally, taking a penultimate output two-dimensional tensor as a last input two-dimensional tensor, and sending the last input two-dimensional tensor to a last fully connected layer of the ANN model for last-layer full connection calculation to generate the ANN output two-dimensional tensor.

Wherein the ANN model comprises a plurality of fully connected layers, the shape of the ANN output two-dimensional tensor is $B_7 \times W_9$, the $B_7$ is a two-dimensional parameter of the ANN output two-dimensional tensor, and $B_7=B_6$, the $W_9$ is a one-dimensional parameter of the ANN output two-dimensional tensor, and $W_9=2$, the ANN output two-dimensional tensor comprises the $B_7$ ANN output one-dimensional tensors, and the ANN output one-dimensional tensor comprises relative diastolic blood pressure data and relative systolic blood pressure data.

Figure 2B:
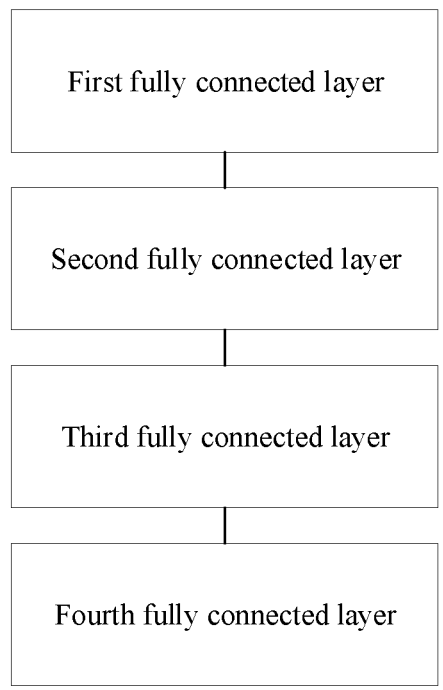
FIG. 2B is a structural schematic diagram of an artificial neural network provided in the first embodiment of the disclosure.

For example, FIG. 2B, which is a structural diagram of an ANN provided in the first embodiment of the disclosure, as shown in FIG. 2B, the ANN model comprises four fully connected layers, then the following steps are performed:

Taking the ANN input two-dimensional tensor as a first input two-dimensional tensor, and then sending the first input two-dimensional tensor to a first fully connected layer of the ANN model for first-layer full connection calculation to generate a first output two-dimensional tensor.

Then, taking the first output two-dimensional tensor as a second input two-dimensional tensor, and sending the second input two-dimensional tensor to a second fully connected layer of the ANN model for second-layer full connection calculation to generate a second output two-dimensional tensor.

Then, taking the second output two-dimensional tensor as a third input two-dimensional tensor, and sending the third input two-dimensional tensor to a third fully connected layer of the ANN model for third-layer full connection calculation to generate a third output two-dimensional tensor.

And finally, taking the third output two-dimensional tensor as a fourth input two-dimensional tensor, and sending the fourth input two-dimensional tensor to a fourth fully connected layer of the ANN model for fourth-layer full connection calculation to generate a fourth output two-dimensional tensor; here, the fourth output two-dimensional tensor is the finally output ANN output two-dimensional tensor.

As can be seen from the above, the ANN model is composed of fully connected layers, and each node of the fully connected layer is connected with all nodes of the previous layer so that to summarize the features extracted from the previous layer. The number of nodes and activation function (ReLU is more common, but others can be used too) of each fully connected layer can be set. In this embodiment, the number of nodes in the last fully connected layer of the ANN model is 2, and the shape of the final corresponding output two-dimensional tensor is $B_7 \times 2$.

For example, the ANN model comprises four fully connected layers, the shape of the ANN input two-dimensional tensor is $5 \times 2560$, then $B_7 = B_6 = 5$, and the shape of the output two-dimensional tensor is $5 \times 2$, which is expressed here as the output two-dimensional tensor [5,2], and the data in the ANN output two-dimensional tensor [5,2] should be:

$$\{(R_{db1}, R_{sb1}), (R_{db2}, R_{sb2}), (R_{db3}, R_{sb3}), (R_{db4}, R_{sb4}), (R_{db5}, R_{sb5})\},$$

wherein $(R_{db1}, R_{sb1}), (R_{db2}, R_{sb2}), (R_{db3}, R_{sb3}), (R_{db4}, R_{sb4}), (R_{db5}, R_{sb5})$ are the data of first, second, third, fourth and fifth ANN output one-dimensional tensors in the ANN output two-dimensional tensor, respectively ($R_{sbi}$ is relative systolic blood pressure data, $R_{dbi}$ is relative diastolic blood pressure data, and the value of i is from 1 to 5).

Step 7, performing blood pressure data calculation according to the nominal diastolic blood pressure data, the nominal systolic blood pressure data and the ANN output two-dimensional tensor to generate a blood pressure two-dimensional tensor.

Specifically comprising: when the preset relative relation information is a difference relation, using the nominal diastolic blood pressure data to perform diastolic blood pressure value increase processing on all the relative diastolic blood pressure data in the ANN output two-dimensional tensor, using the nominal systolic blood pressure data to perform systolic blood pressure value increase processing on all the relative systolic blood pressure data in the ANN output two-dimensional tensor, and then, taking the ANN output two-dimensional tensor after the pressure value increasing process as the blood pressure two-dimensional tensor.

Wherein the shape of the blood pressure two-dimensional tensor is $B_8 \times W_{10}$, the $B_8$ is a two-dimensional parameter of the blood pressure two-dimensional tensor, and $B_8 = B_7$, the $W_{10}$ is a one-dimensional parameter of the blood pressure two-dimensional tensor, and $W_{10} = 2$, the blood pressure two-dimensional tensor comprises the $B_8$ blood pressure one-dimensional tensors, the blood pressure one-dimensional tensor comprises diastolic blood pressure data and systolic blood pressure data, the diastolic blood pressure data is the sum of the corresponding relative diastolic blood pressure data and the nominal diastolic blood pressure data, and the systolic blood pressure data is the sum of the corresponding relative systolic blood pressure data and the nominal systolic blood pressure data.

Here, the relative relationship information comprises at least the difference relative relationship (difference relationship).

Here, in the first embodiment, when the relative relationship information is specifically the difference relationship, it means that the diastolic blood pressure data can be obtained by adding the relative diastolic blood pressure data to the nominal diastolic blood pressure data in the ANN output two-dimensional tensor, and the systolic blood pressure data can be obtained by adding the relative systolic blood pressure data to the nominal systolic blood pressure data.

For example, the ANN output two-dimensional tensor [5,2] is $\{(7,23), (6,22), (7,21), (11,20), (9,18)\}$, the nominal diastolic blood pressure data are 74 mmHg, the nominal systolic blood pressure data are 113 mmHg, $B_8 = B_7 = 5$, $W_{10} = 2$, and the shape of the blood pressure two-dimensional tensor is $5 \times 2$ (here it is expressed as the blood pressure two-dimensional tensor [5,2]).

Then, the data of the blood pressure two-dimensional tensor [5,2] should be:

$$\{(7+74, 23+113), (6+74, 22+113), (7+74, 21+113), (11+74, 20+113), (9+74, 18+113)\} = \{(81,136), (80,135), (81,134), (85,133), (83,131)\}.$$

Step 8, when preset prediction type information is a first type, performing mean blood pressure data calculation according to the blood pressure two-dimensional tensor to generate diastolic blood pressure prediction data and systolic blood pressure prediction data, and when prediction type information is a second type, performing blood pressure data extraction processing on the blood pressure two-dimensional tensor to generate a diastolic pressure prediction data sequence and a systolic pressure prediction data sequence.

Specifically comprising: when the prediction type information is the first type, calculating a mean value of all the diastolic blood pressure data in the blood pressure two-dimensional tensor to generate the diastolic blood pressure prediction data, and calculating a mean value of all the systolic blood pressure data in the blood pressure two-dimensional tensor to generate the systolic blood pressure prediction data; and when the prediction type information is the second type, sequentially extracting the diastolic blood pressure data from the blood pressure two-dimensional tensor to form the diastolic blood pressure prediction data sequence, and extracting the systolic blood pressure data from the blood pressure two-dimensional tensor to form the systolic blood pressure prediction data sequence.

Here, the embodiment of the disclosure supports two types of prediction data output: the first type is to output a pair of mean blood pressure prediction data (diastolic blood pressure prediction data and systolic blood pressure prediction data), and the second type is to extract blood pressure data by slots to form dynamic blood pressure data sequences (diastolic blood pressure prediction data sequence and systolic blood pressure prediction data sequence). The prediction type information is stored in the local storage medium of the equipment, and the embodiment of the disclosure decides which type to use to output the prediction data by reading the content of the prediction type information.

For example, if the prediction type information is the first type and the data of the blood pressure two-dimensional tensor [5,2] are {(81,136), (80,135), (81,134), (85,133), (83,131)}, then:

The diastolic blood pressure prediction data=(81+80+81+85+83)/5=82 (mmHg), and

The systolic blood pressure prediction data=(136+135+134+133+131)/5≈134 (mmHg).

For another example, if the prediction type information is the second type and the data of the blood pressure two-dimensional tensor [5,2] are {(81,136),(80,135),(81,134),(85,133),(83,131)}, then:

The data content of the diastolic blood pressure prediction data sequence [5] is specifically (81,80,81,85,83), and the data content of the systolic blood pressure prediction data sequence [5] is specifically (136,135,134,133,131).

Figure 3:
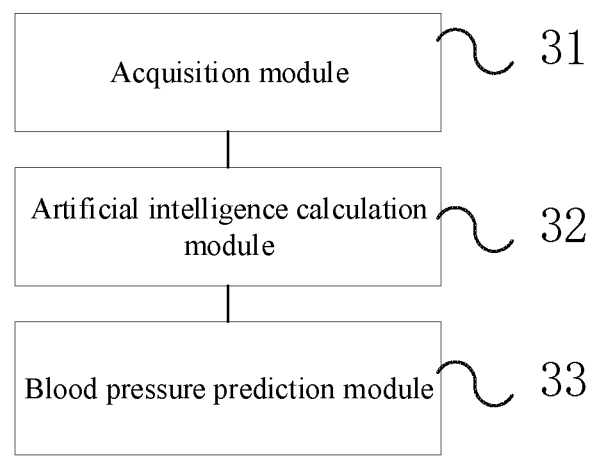
FIG. 3 is a modular structural diagram of a blood pressure prediction device fusing nominal PPG signal data provided in the second embodiment of the disclosure.

FIG. 3 is a modular structural diagram of a blood pressure prediction device fusing nominal PPG signal data provided in the second embodiment of the disclosure. The device may be the terminal equipment or server described in the previous embodiment, or may be a device that enables the terminal equipment or server to implement the method provided in the embodiment of the present disclosure, for example, the device may be a device or chip system of the above-mentioned terminal equipment or server. As shown in FIG. 3, the device comprises:

an acquisition module 31 for acquiring nominal PPG signal data and corresponding nominal diastolic blood pressure data and nominal systolic blood pressure data, and acquiring real-time PPG signal data, a time length of the real-time PPG signal data being the same as that of the nominal PPG signal data.

an artificial intelligence calculation module 32 for performing input data preparation processing on a CNN model according to the nominal PPG signal data and the real-time PPG signal data to generate a CNN input four-dimensional tensor, using the CNN model to perform multi-layer convolution pooling calculation on the CNN input four-dimensional tensor to generate a CNN output four-dimensional tensor, performing input data preparation on an ANN model according to the CNN output four-dimensional tensor to generate an ANN input two-dimensional tensor, and using the ANN model to perform regression calculation on the ANN input two-dimensional tensor to generate an ANN output two-dimensional tensor; and a blood pressure prediction module 33 for performing blood pressure data calculation according to the nominal diastolic blood pressure data, the nominal systolic blood pressure data and the ANN output two-dimensional tensor to generate a blood pressure two-dimensional tensor, performing mean blood pressure data calculation according to the blood pressure two-dimensional tensor to generate diastolic blood pressure prediction data and systolic blood pressure prediction data when preset prediction type information is a first type, and performing blood pressure data extraction processing on the blood pressure two-dimensional tensor to generate a diastolic blood pressure prediction data sequence and a systolic blood pressure prediction data sequence when prediction type information is a second type.

The blood pressure prediction device fusing nominal PPG signal data provided by the embodiment of the present disclosure can implement the method steps in the above method embodiment, and the implementation principles and technical effects are similar, which will not be repeated here.

It should be understood that the division of different modules of the above device is based on logical functions, and in actual implementation, all or part of the modules can be integrated into a physical entity, or they can be physically separated. These modules can all be implemented in the form of software that can be called by processing elements, or all of them can be implemented in the form of hardware, or some modules are implemented in the form of software that can be called by processing elements, and some modules are implemented in the form of hardware. For example, the acquisition module may be a separate processing element, or may be integrated into a certain chip of the above-mentioned device, or it may be stored in a memory of the above-mentioned device in the form of program code, and called by a certain processing element of the above-mentioned device to implement the functions of the above-mentioned determination module. Other modules are implemented similarly. In addition, all or part of these modules may be integrated or implemented separately. The processing element described here may be an integrated circuit with signal processing capability. In the implementation process, each step of the above method or each module may be realized by an integrated logic circuit of hardware in the processor element or instructions in the form of software.

For example, the above modules may be one or more integrated circuits configured to implement the above method, such as one or more application specific integrated circuits (ASIC), one or more digital signal processors (DSP), one or more field programmable gate arrays (FPGA), etc. For another example, when one of the above modules is implemented in the form of a program code that can be called by a processing element, the processing element may be a general purpose processor, such as a central processing unit (CPU) or other processors that can call the program code. For example, these modules can be integrated and implemented in the form of system-on-a-chip (SOC).

In the above embodiments, the functional units can be implemented in whole or in part by software, hardware, firmware or any combination thereof. When implemented by software, the functional units can be implemented in whole or in part by computer program products. The computer program product comprises one or more computer instructions. When the computer program instructions are loaded and executed on a computer, the flow or function according to the embodiment of the disclosure is generated in whole or in part. The computer may be a general purpose computer, a special purpose computer, a computer network, or other programmable devices. The computer instructions may be stored in the computer-readable storage medium or transmitted from one computer-readable storage medium to another. For example, the computer instructions may be transmitted from one website, computer, server or data center to another website, computer, server or data center through wired (such as coaxial cable, optical fiber, digital subscriber line (DSL)) or wireless (such as infrared, wireless, Bluetooth and microwave) methods. The computer readable storage medium may be any available medium that can be accessed by a computer, or a data storage device such as server and data center that contains one or more available media integrations. The available medium may be magnetic medium (e.g., floppy disk, hard disk, magnetic tape), optical medium (e.g., DVD), or semiconductor medium (e.g., solid state disk (SSD)).

Figure 4:
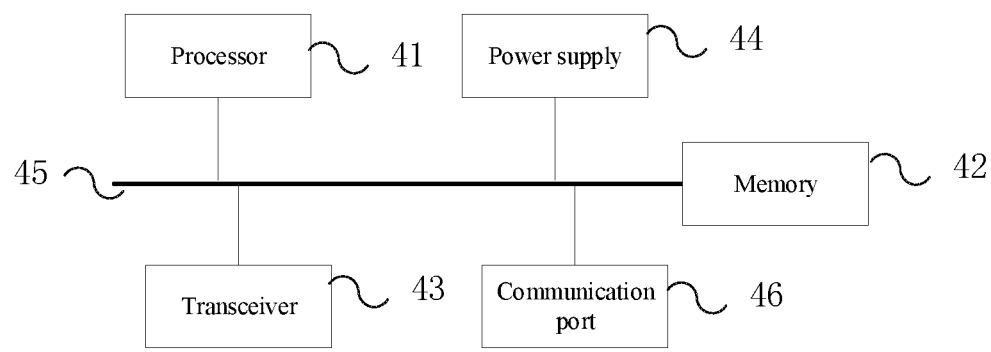
FIG. 4 is a structural schematic diagram of electronic equipment provided by the third embodiment of the disclosure.

FIG. 4 is a structural schematic diagram of electronic equipment provided by the third embodiment of the disclosure. The electronic equipment may be the aforementioned terminal equipment or server, or may be terminal equipment or server connected to the aforementioned terminal equipment or server to realize the method of the embodiment of the present disclosure. As shown in FIG. 4, the electronic equipment may comprise a processor 41 (for example, CPU), a memory 42, and a transceiver 43. The transceiver 43 is coupled to the processor 41, and the processor 41 controls the transceiving action of the transceiver 43. The memory 42 may store various instructions for accomplishing various processing functions and realizing the method and processing procedures provided in the above embodiments of the disclosure. Preferably, the electronic equipment according to the embodiment of the disclosure further comprises a power supply 44, a system bus 45 and a communication port 46. The system bus 45 is configured to realize communication between components. The communication port 46 is used for communication between the electronic equipment and other peripherals.

The system bus mentioned in FIG. 4 may be a peripheral component interconnect (PCI) bus or an extended industry standard architecture (EISA) bus, etc. The system bus may be divided into an address bus, a data bus and a control bus. For convenience of representation, only a thick line is shown in the figure, but it does not mean that there is only one bus or one type of bus. The communication interface is configured to realize communication between a database access device and other devices (such as client, read-write library and read-only library). The memory may comprise a random access memory (RAM) or a non-volatile memory, such as at least one disk memory.

The above processor may be a general purpose processor, including a CPU, a network processor (NP), a graphics processing unit (GPU), etc., and may also be a DSP, an ASIC, an FPGA or other programmable logic devices, discrete gate or transistor logic devices, and discrete hardware components.

It should be noted that the embodiment of the disclosure also provides a computer-readable storage medium, in which instructions are stored, which, when run on a computer, cause the computer to execute the method and processing procedures provided in the above embodiments.

An embodiment of the disclosure also provides a chip for running instructions, and the chip is configured to execute the method and processing procedures provided in the above embodiments.

An embodiment of the disclosure also provides a program product, which comprises a computer program stored in a storage medium. At least one processor may read the computer program from the storage medium, and the at least one processor executes the method and processing procedures provided in the above embodiments.

The embodiment of the disclosure provides a blood pressure prediction method and device fusing nominal PPG signal data, electronic equipment, a computer program product and a computer-readable storage medium. Firstly, the nominal PPG signal data and corresponding nominal blood pressure data (nominal diastolic blood pressure data and nominal systolic blood pressure data) of a test object are obtained, then a well-trained CNN+ANN artificial intelligence blood pressure prediction network for predicting relative blood pressure data is used to perform blood pressure prediction operation on the fused data of the real-time PPG signal data and the nominal PPG signal of the test object to obtain relative blood pressure data (comprising relative diastolic blood pressure data and relative systolic blood pressure data), and then absolute blood pressure data calculation is performed on the nominal blood pressure data and the relative blood pressure data according to relative relationship information to obtain the final predicted blood pressure data. In this way, the prediction accuracy of an artificial intelligence blood pressure prediction network is improved.

Professionals should further realize that the units and algorithm steps of each example described in connection with the embodiments disclosed herein can be implemented in electronic hardware, computer software or a combination of the two. In order to clearly explain the interchangeability of hardware and software, the components and steps of each example have been generally described according to functions in the above description. Whether these functions are implemented in hardware or software depends on the specific application and design constraints of the technical scheme. Professionals can use different methods to implement the described functions for each specific application, but such implementation should not be considered beyond the scope of the disclosure.

The steps of a method or algorithm described in connection with the embodiments disclosed herein may be implemented in hardware, a software module executed by a processor, or a combination of the two. The software module can be placed in a random access memory (RAM), memory, read-only memory (ROM), electrically programmable ROM, electrically erasable programmable ROM, register, hard disk, removable magnetic disk, CD-ROM, or any other form of storage medium known in the technical field.

The above-mentioned specific embodiments further explain the purpose, technical scheme and beneficial effects of the disclosure in detail. It should be understood that the above are only specific embodiments of the disclosure and are not used to limit the scope of protection of the invention. Any modification, equivalent substitution, improvement, etc., made within the spirit and principles of the disclosure should be included in the scope of protection of the invention.

What is claimed is:

1. A blood pressure prediction method fusing nominal photoplethysmography (PPG) signal data, comprising:
    acquiring the nominal PPG signal data and corresponding nominal diastolic blood pressure data and nominal systolic blood pressure data;
    acquiring real-time PPG signal data, a time length of the real-time PPG signal data being the same as a time length of the nominal PPG signal data;
    performing input data preparation processing on a convolutional neural network (CNN) model according to the nominal PPG signal data and the real-time PPG signal data to generate a CNN input four-dimensional tensor;
    using the CNN model to perform a multi-layer convolution pooling calculation on the CNN input four-dimensional tensor to generate a CNN output four-dimensional tensor;
    performing input data preparation processing on an artificial neural network (ANN) model according to the CNN output four-dimensional tensor to generate an ANN input two-dimensional tensor;
    using the ANN model to perform a regression calculation on the ANN input two-dimensional tensor to generate an ANN output two-dimensional tensor;
    performing a blood pressure data calculation according to the nominal diastolic blood pressure data, the nominal systolic blood pressure data and the ANN output two-dimensional tensor to generate a blood pressure two-dimensional tensor; and when a preset prediction type information is a first type, performing a mean blood pressure data calculation according to the blood pressure two-dimensional tensor to generate diastolic blood pressure prediction data and systolic blood pressure prediction data, and when the preset prediction type information is a second type, performing blood pressure data extraction processing on the blood pressure two-dimensional tensor to generate a diastolic blood pressure prediction data sequence and a systolic blood pressure prediction data sequence;

wherein performing the input data preparation processing on the CNN model according to the nominal PPG signal data and the real-time PPG signal data to generate the CNN input four-dimensional tensor comprises:

according to a preset sampling frequency, performing signal data sampling processing on the real-time PPG signal data to generate a real-time PPG data sequence, and performing signal data sampling processing on the nominal PPG signal data to generate a nominal PPG data sequence, wherein a data length L1 of the real-time PPG data sequence is the same as a data length L2 of the nominal PPG data sequence;

according to a preset slot length, performing data slot division processing on the real-time PPG data sequence in sequence to obtain real-time PPG one-dimensional tensors, a number of the real-time PPG one-dimensional tensors comprising a total number of real-time slots, and then fusing the real-time PPG one-dimensional tensors into one two-dimensional tensor to generate a real-time PPG two-dimensional tensor, wherein the total number of real-time slots=int(L1/a slot length), int( ) is a rounding function, a shape of the real-time PPG one-dimensional tensor is 1×W1, the W1 is a one-dimensional parameter of the real-time PPG one-dimensional tensor, and W1=the slot length, a shape of the real-time PPG two-dimensional tensor is B1×W2, the B1 is a two-dimensional parameter of the real-time PPG two-dimensional tensor, and B1=the total number of real-time slots, the W2 is a one-dimensional parameter of the real-time PPG two-dimensional tensor, and W2=W1;

according to the slot length, performing data slot division processing on the nominal PPG data sequence in sequence to obtain nominal PPG one-dimensional tensors, a number of the nominal PPG one-dimensional tensors is a total number of nominal slots, and then fusing the nominal PPG one-dimensional tensors into one two-dimensional tensor to generate a nominal PPG two-dimensional tensor, wherein the total number of nominal slots=int(L2/a nominal slot length), a shape of the nominal PPG one-dimensional tensor is 1×W3, the W3 is a one-dimensional parameter of the nominal PPG one-dimensional tensor, and W3=the nominal slot length, a shape of the nominal PPG two-dimensional tensor is B2×W4, the B2 is a two-dimensional parameter of the nominal PPG two-dimensional tensor, and B2=the total number of nominal slots, the W4 is a one-dimensional parameter of the nominal PPG two-dimensional tensor, and W4=W3;

performing two-dimensional tensor fusion processing on the real-time PPG two-dimensional tensor and the nominal PPG two-dimensional tensor according to the nominal PPG data sequence following real-time data to generate a fused two-dimensional tensor, wherein a shape of the fused two-dimensional tensor is B3×W5, the B3 is a two-dimensional parameter of the fused two-dimensional tensor, and B3=B2=B1, the W5 is a one-dimensional parameter of the fused two-dimensional tensor, and W5=W2+W4, the fused two-dimensional tensor comprises B3 fused one-dimensional tensors, and a fused one-dimensional tensor of the B3 fused one-dimensional tensors is formed by splicing a corresponding real-time PPG one-dimensional tensor and a corresponding nominal PPG one-dimensional tensor according to a sequence of the nominal PPG one-dimensional tensor following the real-time PPG one-dimensional tensor; and according to a four-dimensional tensor input data format of the CNN model, raising the shape of the fused two-dimensional tensor from a two-dimensional tensor shape to a four-dimensional tensor shape to generate the CNN input four-dimensional tensor, wherein a shape of the CNN input four-dimensional tensor is B4×H1×W6×C1, the B4 is a four-dimensional parameter of the CNN input four-dimensional tensor, and B4=B3, the H1 is a three-dimensional parameter of the CNN input four-dimensional tensor, and H1=2, the W6 is a two-dimensional parameter of the CNN input four-dimensional tensor, and W6=W5/2, the C1 is a one-dimensional parameter of the CNN input four-dimensional tensor, and C1=1.

2. The blood pressure prediction method fusing nominal PPG signal data of claim 1, wherein using the CNN model to perform the multi-layer convolution pooling calculation on the CNN input four-dimensional tensor to generate the CNN output four-dimensional tensor comprises:

taking the CNN input four-dimensional tensor as a first input four-dimensional tensor, and then sending the first input four-dimensional tensor to a first convolutional network layer of the CNN model for a first-layer convolution pooling calculation to generate a first output four-dimensional tensor;

taking the first output four-dimensional tensor as a second input four-dimensional tensor, and sending the second input four-dimensional tensor to a second convolutional network layer of the CNN model for a second-layer convolution pooling calculation to generate a second output four-dimensional tensor; and taking a penultimate output four-dimensional tensor as a last input four-dimensional tensor, and sending the last input four-dimensional tensor to a last convolutional network layer of the CNN model for a last-layer convolution pooling calculation to generate the CNN output four-dimensional tensor, wherein the CNN model comprises a plurality of convolutional network layers, a convolutional network layer of the plurality of convolutional network layers comprises a convolution layer and a pooling layer, a shape of the CNN output four-dimensional tensor is $B_5 \times H_2 \times W_7 \times C_2$, the $B_5$ is a four-dimensional parameter of the CNN output four-dimensional tensor, and $B_5=B_4$, the $H_2$ is a three-dimensional parameter of the CNN output four-dimensional tensor, the $W_7$ is a two-dimensional parameter of the CNN output four-dimensional tensor, and the $C_2$ is a one-dimensional parameter of the CNN output four-dimensional tensor.

3. The blood pressure prediction method fusing nominal PPG signal data of claim 2, wherein sending the first input four-dimensional tensor to the first convolutional network layer of the CNN model for the first-layer convolution pooling calculation to generate the first output four-dimensional tensor comprises:

sending the first input four-dimensional tensor into a first convolution layer of the first convolutional network layer for a first convolution calculation to generate a first convolution four-dimensional tensor, and sending the first convolution four-dimensional tensor into a first pooling layer of the first convolutional network layer for a first pooling calculation to generate the first output four-dimensional tensor.

4. The blood pressure prediction method fusing nominal PPG signal data of claim 2, wherein performing input data preparation processing on the ANN model according to the CNN output four-dimensional tensor to generate the ANN input two-dimensional tensor comprises:

according to a two-dimensional tensor input data format of the ANN model, reducing the shape of the CNN output four-dimensional tensor from a four-dimensional tensor shape to a two-dimensional tensor shape to generate the ANN input two-dimensional tensor, wherein a shape of the ANN input two-dimensional tensor is $B_6 \times W'_1$, the $B_6$ is a two-dimensional parameter of the ANN input two-dimensional tensor, and $B_6=B_5$, the $W'_1$ is a one-dimensional parameter of the ANN input two-dimensional tensor, and $W'_1=H_2*W_7*C_2$, the ANN input two-dimensional tensor comprises a $B_6$ ANN input one-dimensional tensors, a shape of the ANN input one-dimensional tensor is $1 \times W'_2$, the $W'_2$ is a one-dimensional parameter of the ANN input one-dimensional tensor, and $W'_2=W'_1$; and adding the nominal diastolic blood pressure data and the nominal systolic blood pressure data to an end of each ANN input one-dimensional tensor, wherein the shape of the ANN input one-dimensional tensor becomes $1 \times W'_3$, the $W'_3$ is a one-dimensional parameter of the ANN input one-dimensional tensor, and $W'_3=W'_2+2=W'_1+2=H_2*W_7*C_2+2$, the shape of the ANN input two-dimensional tensor become $B_6 \times W_8$, the $W_8$ is a new one-dimensional parameter of the ANN input two-dimensional tensor, and $W_8=W'_3=H_2*W_7*C_2+2$.

5. The blood pressure prediction method fusing nominal PPG signal data of claim 4, wherein using the ANN model to perform the regression calculation on the ANN input two-dimensional tensor to generate the ANN output two-dimensional tensor comprises:

taking the ANN input two-dimensional tensor as a first input two-dimensional tensor, and then sending the first input two-dimensional tensor to a first fully connected layer of the ANN model for a first-layer full connection calculation to generate a first output two-dimensional tensor;

taking the first output two-dimensional tensor as a second input two-dimensional tensor, and sending the second input two-dimensional tensor to a second fully connected layer of the ANN model for a second-layer full connection calculation to generate a second output two-dimensional tensor; and taking a penultimate output two-dimensional tensor as a last input two-dimensional tensor, and sending the last input two-dimensional tensor to a last fully connected layer of the ANN model for a last-layer full connection calculation to generate the ANN output two-dimensional tensor, wherein the ANN model comprises a plurality of fully connected layers, a shape of the ANN output two-dimensional tensor is $B_7 \times W_9$, the $B_7$ is a two-dimensional parameter of the ANN output two-dimensional tensor, and $B_7=B_6$, the $W_9$ is a one-dimensional parameter of the ANN output two-dimensional tensor, and $W_9=2$, the ANN output two-dimensional tensor comprises a $B_7$ ANN output one-dimensional tensors, and the ANN output one-dimensional tensor comprises relative diastolic blood pressure data and relative systolic blood pressure data.

6. The blood pressure prediction method fusing nominal PPG signal data of claim 5, wherein performing blood pressure data calculation according to the nominal diastolic blood pressure data, the nominal systolic blood pressure data and the ANN output two-dimensional tensor to generate the blood pressure two-dimensional tensor comprises:

when the relative diastolic blood pressure data and the relative systolic blood pressure data are difference relations, using the nominal diastolic blood pressure data to perform diastolic blood pressure value increase processing on all the relative diastolic blood pressure data in the ANN output two-dimensional tensor, using the nominal systolic blood pressure data to perform systolic blood pressure value increase processing on all relative systolic blood pressure data in the ANN output two-dimensional tensor, and then, taking the ANN output two-dimensional tensor after the pressure value increasing process as the blood pressure two-dimensional tensor, wherein a shape of the blood pressure two-dimensional tensor is $B_8 \times W_{10}$, the $B_8$ is a two-dimensional parameter of the blood pressure two-dimensional tensor, and $B_8=B_7$, the $W_{10}$ is a one-dimensional parameter of the blood pressure two-dimensional tensor, and $W_{10}=2$, the blood pressure two-dimensional tensor comprises a $B_8$ blood pressure one-dimensional tensors, the blood pressure one-dimensional tensor comprises diastolic blood pressure data and systolic blood pressure data, the diastolic blood pressure data is the sum of the corresponding relative diastolic blood pressure data and the nominal diastolic blood pressure data, and the systolic blood pressure data is the sum of the corresponding relative systolic blood pressure data and the nominal systolic blood pressure data.

7. The blood pressure prediction method fusing nominal PPG signal data of claim 6, wherein when the preset prediction type information is the first type, performing the mean blood pressure data calculation according to the blood pressure two-dimensional tensor to generate the diastolic blood pressure prediction data and the systolic blood pressure prediction data, and when the preset prediction type information is the second type, performing the blood pressure data extraction processing on the blood pressure two-dimensional tensor to generate the diastolic pressure prediction data sequence and the systolic pressure prediction data sequence comprise:

when the prediction type information is the first type, calculating a mean value of all the diastolic blood pressure data in the blood pressure two-dimensional tensor to generate the diastolic blood pressure prediction data, and calculating a mean value of all the systolic blood pressure data in the blood pressure two-dimensional tensor to generate the systolic blood pressure prediction data; and when the prediction type information is the second type, sequentially extracting the diastolic blood pressure data from the blood pressure two-dimensional tensor to form the diastolic blood pressure prediction data sequence, and extracting the systolic blood pressure data from the blood pressure two-dimensional tensor to form the systolic blood pressure prediction data sequence.

8. A non-transitory computer-readable storage medium, which stores computer instructions that, when executed by a computer, cause the computer to execute the method of claim 1.

* * * * *